Patented May 28, 1935

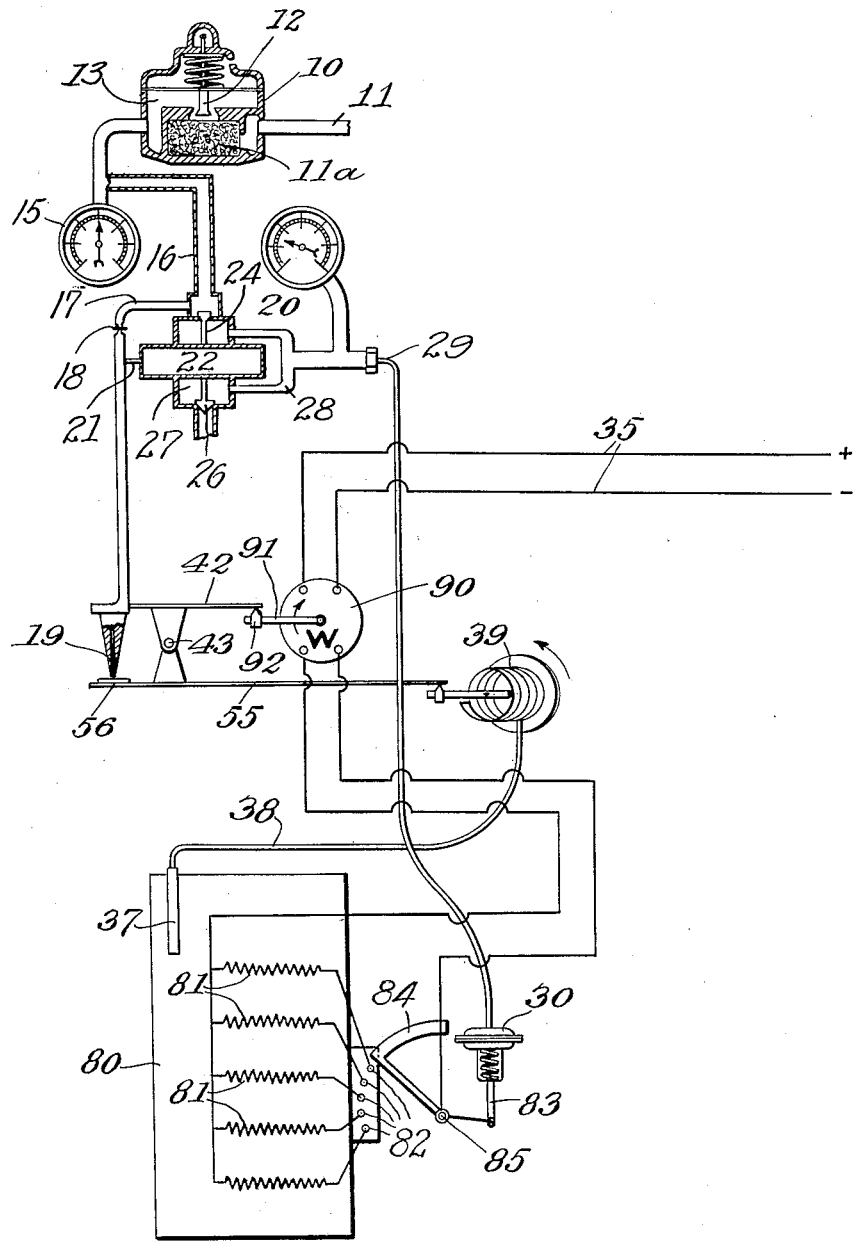

2,002,692

UNITED STATES PATENT OFFICE 2,002,692

CONTROL MECHANISM

Edward T. Dahl, Randolph, Mass., assignor, by mesne assignments, to Eldon Macleod, Westwood, Mass.; Frank A. Morrison, Newton, Mass.; Cameron Macleod, Berwyn, Pa.; Leslie Soule, Dedham, Mass.; Sullivan A. Sargent, Jr., Needham, Mass., trustees, doing business as Mason-Neilan Regulator Company, Boston, Mass.

Application September 30, 1932, Serial No. 635,566

13 Claims. (Cl. 219—20)

This invention relates to control mechanism and more particularly to mechanism for controlling the temperature of a medium being processed in accordance with changes in power of the electric current furnishing the heat.

This invention is a modification and adaptation of the basic principle of control disclosed in my application Ser. No. 635,356 filed September 29, 1932 for Dual control mechanism to which reference is hereby made. The invention herein may be classified as temperature control in an electrically heated installation. This installation is specifically adapted for use in hardening ovens, where more accurate control of the process can be obtained when electricity is used to furnish the heat. A control device on the current supply line controls the amount of electric power supplied for heating. A thermostat or other temperature responsive device is placed in the processed medium, and since much of the fluctuation in the temperature of the processed medium has been discovered to be due to previous fluctuations in the current supply, an instrument responsive to changes in the current characteristic is placed in the current supply line below the control device. The thermostat and instrument responsive to changes in current supply then operate through their resultant action to control the supply of current, by operating on the control device through an independent pressure system. In this way a much more accurate temperature control is obtained over the medium being processed than in previous installations which have controlled by the action of the thermostat alone placed in the processed medium.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing:

The single figure is a diagrammatic view of my dual control mechanism as adapted for temperature control in an electrically heated installation.

10 represents a mechanism for maintaining an adequate and constant pressure of air for operating the independent pressure system which in turn operates the control valve of the fuel supply line. It differs slightly from the mechanism of Ser. No. 635,356, 11a being a horsehair or felt strainer to remove all dirt and moisture from the operating air, but in principle, the operation is the same. The air is supplied through pipe 11 and passes into the reservoir 13 through reducing valve 12, which is preferably set for 15 pounds pressure. The air from reservoir 13 passes down the pipe 16 leading to a diaphragm mechanism 20 and a flexible branch pipe 17 having a fixed orifice 18 bypasses the stream of air. The independent pressure system ordinarily exhausts to the atmosphere through the exhaust orifice 19, but as controlled by the flapper 56 actuated by the changes in current supply, the independent pressure is diverted through the diaphragm mechanism 20 to the control device 30 on the current supply line 35.

Branch pipe 17 connects with the relay mechanism 20 through pipe 21 below the fixed orifice 18 which leads into a central diaphragm chamber 22. A stem 24 abutting the top side of the diaphragm chamber 22 forms a valve between pipe 16 and chamber 25. A similar stem 26 abutting the bottom side of the diaphragm chamber 22 forms an exhaust valve between the chamber 27 and the atmosphere. Both chambers are connected on the outside by pipe 28 which leads through pipe 29 to the control valve 30. Control device 30, which is preferably a diaphragm operated by pressure, controls the number of heating coils 81 operating in oven 80.

On the closing of exhaust orifice 19, pressure in diaphragm chamber 22 builds up, forcing valve 26 closed and valve 24 open, allowing pressure from pipe 16 to enter directly into chamber 25, flow through connecting pipe 28 into chamber 27 and equalize the pressures therein. When pressure in chamber 25 balances the force in central chamber 22, valve 24 closes to prevent pressure in 25 from increasing. Air then flows through pipes 28 and 29 to control device 30, the pressure of which on the diaphragm moves the arm 83 to control the number of heating coils 81.

An oven or furnace 80 is provided in which the material or substance being processed is heated. A thermostat 37 or other temperature responsive instrument containing an expansible fluid (if temperatures controlled are low enough to permit this kind of thermostat) is placed in the oven 80, and connects through pipe 38 to a helical coil 39, Bourdon tube or other pressure responsive device—(i. e. pressure responsive when thermostat 37 contains an expansible fluid). Current is supplied to the oven 80 through the current supply lines 35 and heats the heating coils 81. Heating coils 81 comprise any desired number of units, the number being heated at any time being increased or reduced by means of control device 30, preferably comprising a diaphragm motor valve, and actuated by the independent pressure system later described. The device 30 lacks, however, the usual valve body, and has in its place an arm 83 which moves the segment 84 around fulcrum 85. The segment 84 is a means of contact with the contact buttons 82 attached to each unit of the heating coils 81 so that with a change in temperature in the oven 80 the pointer or indicator arm 84 moves across the buttons 82 and consequently adds or cuts out a number of heating units as necessary. Also connected in the current supply lines 35 is a watt meter 90 or other instrument responsive to changes in electric power. The watt meter 90 is of any suitable construction and operates to move an arm 91 fulcrumed at one end and with a sliding wedge 92 on the other end placed in abutting relation to the lever 42, in turn fulcrumed at 43.

The device operates in the same manner as that described in my application Ser. No. 635,356 previously referred to. An increase in temperature in the oven 80 is transmitted through the thermostat 37 which causes helical coil 39 to unwind and move flapper 56 to partially close exhaust valve 19, which diverts the independent pressure to control device 30, and causes control valve 30 to cut out one or more heating units, as necessary, thereby reducing the amount of heat supplied to the oven 80. On a decrease in temperature the action is opposite. Likewise, the watt meter 90 reacts to changes in the current supply, which changes are transmitted to the arm 91. An increase in wattage, for instance, causes arm 91 to move upwardly tilting lever 42 about its fulcrum 43, moving orifice 19 toward flapper 56, partially closing orifice 19 and thereby diverting the independent pressure to the control device 30, to cut out heating units and thereby decrease the heat supplied to oven 80. On decrease in wattage, the action is opposite. The temperature responsive instrument 37 and the watt meter 90 operate independently as their respective conditions change, but the control device 30 in the current supply line 35 is actuated by the resultant of the movements induced by the two instruments.

The thermostat or temperature bulb 37 filled with an expansible gas, is suitable only for relatively low temperatures (600° F.). For over 1000° F. the temperature responsive instrument 37 would have to be electric, and would operate preferably by measuring the E. M. F. across wires of two different metals such as brass and copper, or iron and steel. Thus with a change in temperature of the oven 80 there would be a change in the rate of flow of current between the two wires which would be indicated on a galvanometer or millivoltmeter. In such case the helical coil 39 would be replaced by any suitable mechanism reacting to such changes in rate of flow of current and the lever 55 and the flapper 56 would be moved in the same manner.

If desired the heat for heating the oven 80 can be varied by using a resistance bank or rheostat placed in the current supply line, so that with a change in temperature in the oven 80 the arm 84 will move across the resistance bank and consequently change the voltage drop across the heating coil, across the positive and negative lines and current supply, instead of adding or cutting out a number of heating units as disclosed and described herein.

By means of my invention changes in temperature of the oven are anticipated and fluctuations in the current supply are compensated for through the independent pressure system operating on control device 30, before these fluctuations have affected the temperature of the heating coil 81 and oven 80. The temperature of the oven 80 and the processed medium is governed therefore by the joint and resultant action of the two instruments, one responsive to changes in temperature of the oven, the other responsive to changes in wattage of the current supply, or in the amount of power. In this way a much more accurate temperature control of the oven is secured, and the flow of current for heating is more even and constant, rather than being alternately turned on and shut off, and hunting action is thereby prevented. This is highly important in the processing of any material where accurate temperature control is desirable or essential.

What I claim is:

1. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, and means responsive to the resultant effect of the temperature of the oven and changes in the current supply for actuating said exhaust valve.

2. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, means for diverting said pressure to operate said control device on the closing of said exhaust valve, and joint means responsive to the temperature of the oven and changes in the current supply for actuating said exhaust valve through the resultant action of said temperature and changes in the current supply.

3. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, a supply and waste valve in said pilot mechanism, diaphragm mechanism acted on by said pressure and actuating said supply and waste valve to divert said pressure to the control device to operate the same on the closing of the exhaust valve, and joint means responsive to the resultant effect of the temperature of the oven and changes in the current supply for actuating said exhaust valve.

4. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, an instrument responsive to the temperature of the oven, another instrument responsive to changes in the current characteristics of the current supply line, and joint means operated by the resultant action of said instruments for actuating the exhaust valve of the independent pressure system.

5. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, means for diverting the said pressure for operating said control device on the closing of said exhaust valve, an instrument responsive to the temperature of the oven, another instrument responsive to changes in the current characteristics of the current supply line, and joint means operated by the resultant action of said instruments for actuating the exhaust valve of the independent pressure system.

6. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, a supply and waste valve in the pilot mechanism, diaphragm mechanism acted on by said pressure and actuating said device to divert said pressure to the control supply and waste valve for operating the same on the closing of the exhaust valve, an instrument responsive to the temperature of the oven, another instrument responsive to changes in the current characteristics of the current supply line, and joint means operating by the resultant action of said instruments for actuating the exhaust valve of the pilot mechanism.

7. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism comprising a movable orifice and flapper, levers for moving said orifice and flapper toward and away from each other about a common axis and so operating said exhaust valve, a thermostat responsive to the temperature of the oven, a watt meter responsive to changes in wattage in the current supply line, a helical coil actuated by the thermostat for moving the flapper lever, an arm actuated by the watt meter for moving the orifice lever and so actuating the exhaust valve of the independent pressure system through the resultant action of said thermostat and watt meter.

8. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust from said pilot mechanism, a thermostat responsive to the temperature of the oven, a watt meter responsive to changes in wattage of the current supply line and joint means operated by the resultant action of said thermostat and watt meter for actuating the exhaust valve of the independent pressure system.

9. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust of said pressure to the atmosphere, a supply and waste valve in said pilot mechanism for supplying and wasting pressure to and from said control device, diaphragm means in said pilot mechanism acted on by said pressure for actuating the supply and waste valve, and joint means responsive to the resultant effect of the temperature of the oven and changes in the current supply for actuating said exhaust valve.

10. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust of said pressure to the atmosphere, a supply and waste valve in said pilot mechanism for supplying and wasting pressure to and from said control device, diaphragm means in said pilot mechanism acted on by said pressure for actuating the supply and waste valve, an instrument responsive to the temperature of the oven, another instrument responsive to changes in the current characteristics of the current supply line, and joint means operating by the resultant action of said instruments for actuating the exhaust valve of the pilot mechanism.

11. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust of said pressure to the atmosphere including an orifice and flapper, a supply and waste valve in said pilot mechanism for supplying and wasting pressure to and from said control device, a diaphragm chamber in said pilot mechanism acted on by said pressure for actuating said supply and waste valve, levers for moving said orifice and flapper toward and away from each other about a common axis and so operating said exhaust valve, a thermostat responsive to the temperature of the oven, a watt meter responsive to changes in wattage in the current supply line, a coil actuated by the thermostat for moving the flapper lever, an arm actuated by the watt meter for moving the orifice lever and so actuating the exhaust valve of the independent pressure system through the resultant action of said thermostat and watt meter.

12. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control device for operating the same on the closing of said exhaust valve, and joint means responsive to the resultant effect of the temperature of the oven and changes in the current supply for actuating said exhaust valve.

13. An apparatus for controlling the temperature of an electrically heated oven, comprising an electric current supply line for heating the oven, a control device governing the supply of said current, a pilot mechanism utilizing an independent source of pressure for operating said control device and ordinarily exhausting to the atmosphere, an exhaust valve governing the exhaust of said pressure to the atmosphere, said pilot mechanism including a casing, a pair of diaphragms dividing said casing into two outer chambers and an inner chamber, a supply valve and a waste valve in said outer chambers governing the supply and waste of pressure in said system, said pressure expanding said inner chamber and actuating said supply and waste valves to divert said pressure to the control device for operating the same on the closing of said exhaust valve, an instrument responsive to the temperature of the oven, another instrument responsive to changes in the current characteristics of the current supply line, and joint means operating by the resultant action of said instruments for actuating the exhaust valve of the pilot mechanism.

EDWARD T. DAHL.